Figures 1, 2:
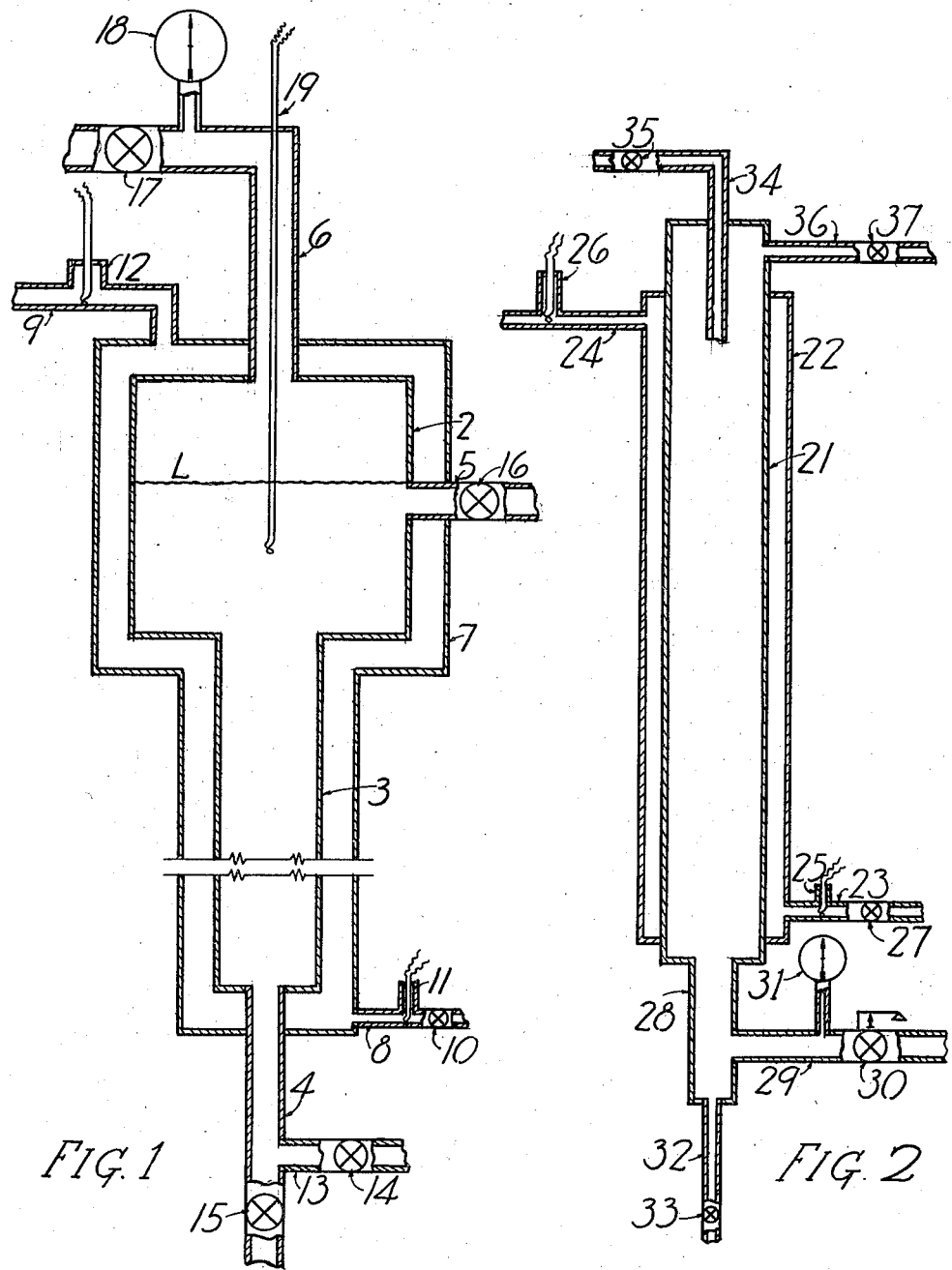

Aug. 31, 1937.  M. R. FENSKE ET AL  2,091,630

PROCESS OF SEPARATING A MIXTURE OF TRIMETHYLAMINE AND AMMONIA

Filed Oct. 16, 1934

INVENTOR.
Merrell R. Fenske
BY Chester E. Andrews
Robert W. Englehart
ATTORNEY.

Patented Aug. 31, 1937

2,091,630

UNITED STATES PATENT OFFICE 2,091,630

PROCESS OF SEPARATING A MIXTURE OF TRIMETHYLAMINE AND AMMONIA

Merrell R. Fenske, State College, and Chester E. Andrews, Overbrook, Pa., assignors to Röhm & Haas Company, Philadelphia, Pa.

Application October 16, 1934, Serial No. 748,476

5 Claims. (Cl. 260—127)

This invention relates to the process of manufacturing methyl amines and particularly to a process for fractionally separating them from each other and from ammonia.

In the process of producing the methyl amines from methanol and ammonia catalytically, the product contains all three methylamines, mono-, di- and tri-, as well as water and the unreacted ammonia and methanol. On distillation the trimethylamine forms a constant boiling mixture with ammonia and also with monomethylamine so that it is impossible to separate these materials completely by distillation. It is possible to remove all the trimethylamine from the mixture, as a constant boiling mixture, provided sufficient ammonia is present, and then to separate the mono and dimethyl amines by ordinary fractional distillation. In this way pure monomethylamine and pure dimethylamine could be prepared but it was impossible to separate the trimethylamine in a pure state from the ammonia except by chemical means.

Trimethylamine forms constant boiling mixtures with other substances besides ammonia such as monomethylamine and ammonia forms one with dimethyl ether, and these mixtures can be separated in the same way as the constant boiling mixture of trimethylamine and ammonia.

It is an object of this invention to provide a method whereby constant boiling mixtures containing trimethylamine or ammonia and another substance may be separated completely into their individual components without causing any chemical changes to take place in any of those components.

The present invention is based on the fact that the solubilities of the components of any of the constant boiling mixtures, in any given solvent are different and by suitably arranging the relative amounts of solvent and gas mixture fed into the system in a given time a complete separation of the components can be attained.

The mixture of gases to be separated does not have to correspond in composition to the constant boiling mixture since any mixture of the two components can be separated in this manner. In the examples chosen to illustrate this invention a mixture approximating that of the constant boiling mixture is used for the reason that such mixtures are met with more frequently in the process of manufacturing the methylamines.

The liquid used for the separation of the two components will determine which of the two remains in solution, the other being removed in the gaseous form and subsequently condensed. For instance, if the mixture consists of trimethylamine and ammonia and water is used for the separation, the ammonia will remain in the water and the amine will be removed as a gas. If an organic solvent such as methanol, butylalcohol or kerosene is used the ammonia will pass through as a gas, leaving the amine dissolved in the liquid.

The process is preferably carried out under super-atmospheric pressure and the actual pressure used will be chosen so as to permit the condensation of the overhead gas to take place within the system and within the temperature range of available cooling water. Variations in pressure have only a very slight effect on the efficiency of the separation.

The process may be carried out in any suitable apparatus such as is shown in the drawing attached hereto. The gas mixture to be separated may be bubbled through the liquid in an apparatus such as is shown in Fig. 1, or it may be run countercurrent to the liquid in an apparatus as shown in Fig. 2.

Referring to the drawing and specifically to Fig. 1, a cylindrical vessel 2 having a pipe 3 attached to the bottom, an inlet pipe 4 and outlet pipes 5 and 6 is mounted in a jacket 7 which completely surrounds the vessel 2 and lower extension 3. The jacket has an inlet pipe 8 and an outlet pipe 9. A valve 10 is inserted in the inlet pipe 9 to control the flow of heating or cooling liquid to the jacket. Thermocouples or thermometers 11 and 12 are inserted in the inlet and outlet pipes respectively to record the temperature of the heating or cooling liquid. A pipe 13 with valve 14 is connected to the inlet pipe 4 of the inner vessel and a valve 15 is attached to an extension of inlet pipe 4. The outlet pipe 5 has a valve 16 to control the flow of solution from the inner vessel. The outlet pipe 6 also has a valve 17 to control the flow of gas from the inner vessel and a pressure gage 18 for recording the pressure within the vessel 2. A thermocouple or thermometer 19 is inserted in the inner vessel 2 to show the temperature of the liquid.

Figure 2 shows a different apparatus for carrying out the same process. An inner tube 21 is surrounded by a jacket 22. This jacket has an inlet pipe 23 and an outlet pipe 24 in which are inserted thermocouples or thermometers 25 and 26 for recording the temperature of the heating fluid. A valve 27 in the inlet line controls the flow of this fluid.

The inner tube has a lower extension 28 to which an inlet pipe 29 carrying a regulating valve 30 and a pressure gage 31, is attached. The lower extension 28 also carries a sight glass 32 and a valve 33 for regulating the flow of liquid from the inner tube. An inlet pipe 34 and valve 35 are attached to the upper end of the inner tube as are the outlet pipe 36 and valve 37.

In operating the apparatus shown in Fig. 1, water or other heating medium at any desired temperature is passed continuously through the jacket. In order to assist in maintaining the temperature the jacket may be insulated if desired.

The inner vessel is filled with water or other liquid to the level L so that it will just overflow through pipe 5. The mixture of gases to be separated is then admitted through valve 14 and by keeping valve 17 closed, any desired pressure up to the saturation pressure of the solution may be attained. Valve 17 is then opened enough to keep the pressure reasonably constant. By regulating valves 15 and 16 a constant flow of liquid can be maintained through the apparatus.

As the mixture of gases passes through, the more soluble one is concentrated in the liquid and the less soluble one passes through and is removed through valve 17.

After the apparatus is in operation the flow of liquid and gas mixture are set at constant rates which results in a constant degree of separation of the components of the gas.

The apparatus shown in Fig. 2 operates somewhat differently. The inner tube 21 is packed with any ordinary tower packing such as rings, chains, broken tile, etc. Bubble plates may also be used if desired. Water or other heating or cooling fluid is passed through the jacket so as to maintain the desired temperature within the inner tube 21. The gas mixture is admitted at a constant rate through valve 30 and when the desired pressure is attained it is regulated by proper adjustment of the exit valve 37. Water or other absorbing liquid is admitted through valve 35 and pipe 34 and trickles down over the packing through the sight glass 32 and is drawn off through valve 33.

As the gases and liquid pass in opposite directions the more soluble one is removed by the liquid and the less soluble one passes out through valve 37. After the apparatus is in operation the rates of flow of gas and liquid are kept constant so that a constant degree of separation of the components of the gas is attained.

The pressure and temperature may be varied over a considerable range without affecting the efficiency of the separation. It is even possible to adjust them so that two liquid phases are present in the inner tube.

The following examples will serve to illustrate the operation of both types of apparatus but the invention is not limited to the exact conditions of temperature, pressure, rates of flow or composition of the gas mixture given in the examples, as the invention may be otherwise practiced within the scope of the appended claims.

*Example 1.*—A mixture of 22% of trimethylamine and 78% of ammonia, approximately the composition of a constant boiling mixture, was passed into the apparatus shown in Fig. 1 at a rate of 0.32 lb. per hour and water was passed through at the rate of 0.754 lb. per hour. The temperature of the jacket water was 135° F. and the pressure within the apparatus 30 lb. per square inch. The total gas dissolved by the liquid amounted to 68% of the amount charged and of this 90% was ammonia and 10% trimethylamine. The overhead gases amounted to 38% of the charge and of this 43% was trimethylamine. Thus 74% of the trimethylamine charged was removed overhead and 71% of the ammonia was removed in the solution.

*Example 2.*—The same gas mixture as in Example 1 was fed into the apparatus at a rate of 0.38 lb. per hour and the water at 0.661 lb. per hour. The temperature of the jacket water was 140° F. and the pressure 30 lb. per square inch. Of the total gas fed 49% was removed overhead and of this 37% was trimethylamine or 82% of the total trimethylamine. The total gas absorbed contained 93% of ammonia or 62% of the total ammonia fed.

*Example 3.*—The same gas mixture as used in Example 1 was fed into the apparatus shown in Fig. 2. The temperature of the jacket water was 97° F. at the inlet and 102° at the outlet. The pressure was 30 lb. per square inch. Water was used as the absorbing liquid and was passed at a rate of 0.132 lb. per hour. The mixed gases were admitted at the rate of 0.082 lb. per hour. Of the total gas removed overhead 2% was ammonia and 98% was trimethylamine which amounted to 95% of the total trimethylamine charged. The gas absorbed by the water contained 2.5% of trimethylamine and 97.5% of ammonia or 99.3% of the total ammonia charged.

*Example 4.*—The same gas mixture as in Example 1 was charged in the same apparatus. The temperature in the jacket was 212° F. and the pressure 30 lb. per square inch. Water was used as the absorbing liquid and was charged at the rate of 1.38 lb. per hour, the gas mixture being charged at the rate of 0.180 lb. per hour. The overhead gas contained 99.8% of trimethylamine or 95% of the total charged and the gas absorbed contained 98.3% of ammonia or 99.9% of the total charged.

*Example 5.*—The same gas mixture as in previous examples was charged to the apparatus shown in Fig. 2. The temperature of the water entering the jacket was 93° F. and at the outlet was 118° F. The pressure within the tube was 30 lb. per square inch. Methanol was used as the absorbing liquid and was fed at a rate of 0.60 lb. per hour. The gas mixture was charged at the rate of 0.47 lb. per hour. The overhead gases contained 18% of trimethylamine and 82% of ammonia and the gas absorbed contained 77% of ammonia and 23% of trimethylamine. Of the total base charged 85% was dissolved so that the overhead contained 12% of the total trimethylamine and 16% of the total ammonia, the remainder of each being in the solution.

*Example 6.*—The same gas mixture as in previous examples was fed to the apparatus under the same conditions of temperature and pressure. The absorbing liquid was tertiary butyl alcohol and was charged at the rate of 0.33 lb. per hour. The gases were charged at the rate of 0.54 lb. per hour of which 0.22 or 40.8% was dissolved by the liquid, the remainder passing through the system. The overhead gas contained 10% of trimethylamine and 90% of ammonia or 27% and 68% respectively of the total amounts fed to the system, the remainder of each gas being removed in the liquid.

*Example 7.*—Triisobutylene was substituted for the tertiary butyl alcohol and was fed to the system at the rate of 0.47 lb. per hour. The same gas mixture was fed at 0.23 lb. per hour of which 0.074 lb. or 32% was absorbed, the remainder passing through the system. The overhead gas contained 7% of trimethylamine and 93% of ammonia or 10% and 38% respectively of the total amounts fed to the system.

*Example 8.*—Kerosene was substituted for the triisobutylene and was fed at the rate of 0.49 lb. per hour. The same gas mixture as previously was fed at the rate of 0.17 lb. per hour of which 0.034 lb. or 20% was absorbed. The overhead gas contained 3% of trimethylamine and 97% of ammonia and the gases contained in the liquid contained no ammonia. In this case practically a complete separation of the two gases was obtained on a single pass through the apparatus.

*Example 9.*—A mixture of 57% of ammonia and 43% of dimethyl ether was passed through the apparatus shown in Fig. 2. The temperature in the jacket was 64° F. and the pressure 30 lb. per square inch. Water was used as the absorbing liquid and was charged at 0.15 lb. per hour. The gas mixture was charged at the rate of 0.5 lb. per hour. The overhead gas contained no ammonia. The gases absorbed by the liquid contained 87.6% of ammonia (100% of that charged) and 12.4% of dimethyl ether (19% of that charged).

*Example 10.*—The same gas mixture and apparatus were used as in Example 9. The temperature was 63° F. and the pressure 20 lb. per square inch. Water was used as the absorbing medium and was charged at the rate of 0.15 lb. per hour. The gas mixture was charged at 0.5 lb. per hour. The overhead gases contained no ammonia and the gases absorbed in the water contained 87.6% (100% of that charged) of ammonia and 12.4% (20% of that charged) of dimethyl ether.

By a suitable choice of absorbing liquid and operating conditions it is possible to effect a substantially complete separation of mixtures of trimethylamine or ammonia with other gases or vapors which cannot be separated by ordinary fractional distillation. The type of liquid chosen determines which of the two components is dissolved to the greater extent. Thus with ammonia and trimethylamine for example the ammonia remains in water and is removed as an aqueous solution whereas with organic liquids the trimethylamine remains in solution.

We claim:

1. The process of separating the gaseous azeotropic mixture of ammonia and trimethylamine which comprises treating said mixture with water.

2. The process of separating a mixture of trimethylamine and ammonia which comprises selectively absorbing the ammonia in water by passing the mixture in contact with a stream of water flowing counter-current thereto under a pressure of approximately thirty pounds per square inch and at a temperature of approximately 212° F.

3. The process of separating a mixture of trimethylamine and ammonia which comprises selectively absorbing the ammonia in water by passing the mixture in contact with a stream of water flowing counter-current thereto and at a temperature of from about 97° F. to about 212° F.

4. The process of separating a mixture of trimethylamine and ammonia which comprises selectively absorbing the ammonia in water by passing the mixture in contact with a stream of water flowing counter-current thereto.

5. The process of separating a mixture of trimethylamine and ammonia which comprises selectively absorbing the ammonia in water by passing the mixture in contact with a flowing stream of water.

MERRELL R. FENSKE.
CHESTER E. ANDREWS.